UNITED STATES PATENT OFFICE.

RENÉ BOHN, OF MANNHEIM, GERMANY, ASSIGNOR TO BADISCHE ANILIN & SODA FABRIK, OF LUDWIGSHAFEN-ON-THE-RHINE, GERMANY, A CORPORATION.

INDANTHRENE MONOSULFONIC ACID AND PROCESS OF MAKING SAME.

948,204.     Specification of Letters Patent.     Patented Feb. 1, 1910.

No Drawing.     Application filed September 23, 1909. Serial No. 519,193.

*To all whom it may concern:*

Be it known that I, RENÉ BOHN, doctor of philosophy and chemist, a citizen of the Swiss Republic, residing at Mannheim, Germany, have invented new and useful Improvements in Indanthrene Monosulfonic Acid and Processes of Making Same, of which the following is a specification.

In the specification of Letters Patent No. 692,762 is described the production of a sulfonic acid of indanthrene blue either by melting beta-amino-anthraquinone sulfonic acid with caustic alkali, or by treating indanthrene with fuming sulfuric acid. The sulfonic acid so obtained is described as being soluble in water (the solution being greenish blue) and as dyeing animal fiber greenish blue. I have now discovered that by treating indanthrene blue with milder sulfonating agents, for instance with sulfuric acid monohydrate, or with ordinary concentrated sulfuric acid containing about 95 per cent. $H_2SO_4$, and preferably in the presence of boric acid, an indanthrene sulfonic acid can be obtained which is different from that described in the aforesaid specification, since it is difficultly soluble in water (the solution being reddish blue) and dyes animal fiber in even and deep brilliant blue shades. The product obtainable according to the present invention is a monosulfonic acid, while that obtainable according to the aforesaid Letters Patent No. 692,762 is a disulfonic acid.

When boric acid is used during the process of sulfonation according to my invention, better yields are obtained than are produced when no boric acid is employed.

The following is an example of how my invention may be carried into practical effect, but the invention is not confined to this example. The parts are by weight. Introduce one part of powdered indanthrene blue, at a temperature of thirty degrees centigrade, into a solution of one part of anhydrous boric acid in five parts of sulfuric acid monohydrate. Stir for several hours, then add ten parts of sulfuric acid monohydrate and heat the whole for from four, to five, hours at a temperature of one hundred and thirty degrees centigrade. When the mixture is cold, pour it onto ice and water, boil for one hour, filter while hot, and wash the residue, which is a dark blue powder difficultly soluble in water, the solution being reddish blue. It yields a clear olive solution in 97 per cent. sulfuric acid and a dull olive-brown solution in fuming sulfuric acid (containing 23 per cent. free $SO_3$). With alkaline hydrosulfite it yields a cornflower blue colored vat.

Now what I claim is:—

1. The process of producing indanthrene monosulfonic acid by treating indanthrene blue with a mild sulfonating agent substantially as described.

2. The process of making indanthrene monosulfonic acid by heating indanthrene blue with sulfuric acid monohydrate and anhydrous boric acid.

3. As a new article of manufacture indanthrene monosulfonic acid which is difficultly soluble in water, the solution being reddish blue, which yields a clear olive solution in concentrated sulfuric acid, a dull olive-brown solution in 23 per cent. fuming sulfuric acid, and dyes animal fiber deep and brilliant blue shades.

In testimony whereof I have hereunto set my hand in the presence of two subscribing witnesses.

RENÉ BOHN.

Witnesses:
    J. ALEC. LLOYD,
    KATHI KIRCHHORT.